United States Patent
Yuan

(10) Patent No.: US 8,138,740 B2
(45) Date of Patent: Mar. 20, 2012

(54) NON-LINEAR COMPENSATION RAMP FOR CURRENT MODE PULSE WIDTH MODULATION

(75) Inventor: Henry H. Yuan, Fremont, CA (US)

(73) Assignee: IML International, Grand Cayman (KY)

( * ) Notice: Subject to any disclaimer, the term of this patent is extended or adjusted under 35 U.S.C. 154(b) by 27 days.

(21) Appl. No.: 12/697,090

(22) Filed: Jan. 29, 2010

(65) Prior Publication Data

US 2011/0187342 A1    Aug. 4, 2011

(51) Int. Cl.
*G05F 1/56* (2006.01)
*G05F 1/563* (2006.01)
*G05F 1/565* (2006.01)
*G05F 1/575* (2006.01)

(52) U.S. Cl. .................................... 323/288; 323/282
(58) Field of Classification Search .......... 323/275–277, 323/279, 280, 282, 288, 278
See application file for complete search history.

(56) References Cited

U.S. PATENT DOCUMENTS

| 6,522,115 B1 * | 2/2003 | Greitschus | 323/288 |
| 2005/0024033 A1 * | 2/2005 | Nakata | 323/282 |
| 2006/0006854 A1 * | 1/2006 | Oswald et al. | 323/282 |

* cited by examiner

*Primary Examiner* — Gary L Laxton
*Assistant Examiner* — Nusrat Quddus
(74) *Attorney, Agent, or Firm* — Patterson & Sheridan, LLP

(57) ABSTRACT

A current mode direct current-to-direct current (DC-to-DC) voltage regulator controls its output voltage using a pulse width modulation (PWM) circuit that employs a non-linear compensation ramp. By employing such a PWM circuit, the output voltage can be controlled more robustly over a wider range of operating conditions.

10 Claims, 5 Drawing Sheets

NON-LINEAR COMPENSATION RAMP FOR CURRENT MODE PULSE WIDTH MODULATION

BACKGROUND OF THE INVENTION

1. Field of the Invention

Embodiments of the present invention relate generally to power conversion circuits and, more specifically, to a non-linear compensation ramp for current mode pulse width modulation.

2. Description of the Related Art

Electronic systems commonly employ power conversion subsystems to provide regulated voltage supplies to various circuits requiring stable supply voltages. One type of power conversion subsystem is referred to as a direct current-to-direct current (DC-to-DC) regulator. DC-to-DC regulators are typically configured to periodically transmit energy from an energy source, such as a battery, to an energy load that requires a specific output voltage or current. DC-to-DC regulators conventionally employ a technique known in the art as pulse width modulation (PWM) in which an amount of energy proportional to a pulse width is transferred through an electronic switch from the energy source to the energy load in order to maintain the specific output voltage or current, even as the energy source and energy load vary. Regulation is achieved by modulating the pulse width appropriately to adjust how much energy is transferred in each period to compensate for changing source and load conditions.

A DC-to-DC voltage regulator configured to implement PWM commonly comprises an inductor, capacitors, a diode, external or internal MOS, and at least one electronic switch MOS configured to periodically transfer energy from the inductor to the capacitor, based on a feedback system that samples the output voltage and current in the electronic switch. If the output voltage trends lower during a given period, a proportionally larger amount of energy is transferred from the inductor to the capacitor in a subsequent energy transfer period. Similarly, if the output voltage trends higher during a given period, a proportionally smaller amount of energy is transferred from the inductor to the capacitor in a subsequent energy transfer period. The feedback system may use sampled voltages for feedback or a combination of sampled voltages and sampled currents for feedback.

A current mode DC-to-DC voltage regulator includes a feedback system that uses both sampled voltages and sampled currents. Voltage sampling compares the output voltage with a reference voltage to generate an error voltage that is proportional to the difference between the output voltage and reference voltage. Current sampling compares the instantaneous current flowing in the inductor with the error voltage to determine a duty-cycle for the power switch. The voltage sample feedback path comprises an outer feedback control loop, while the current sample feedback path comprises an inner feedback control loop.

Current mode DC-to-DC voltage regulators typically exhibit greater regulation load regulation stability, which is a desirable characteristic. However, under certain conditions (Switch Duty>50%), current mode DC-to-DC voltage regulators exhibit instability that must be managed. One example of instability is known in the art as sub-harmonic oscillation, where the outer feedback control loop and inner feedback control loop generate opposing feedback responses in each period, creating a lower frequency (sub-harmonic) oscillation. This sub-harmonic oscillation signal is emitted from the regulator as noise in the output voltage.

A technique known in the art as slope compensation may be used to reduce the sub-harmonic oscillation. Slope compensation uses a summation circuit to add a linear ramp function to the sampled version of a current ramp in the inductor. The sum signal rather than the inductor current signal is then used as the feedback signal for the inner feedback control loop. Adding in the linear ramp function has the effect of lowering the current feedback loop as a function of on time (% duty cycle) for the electronic switch. However, without slope compensation, when the electronic switch duty cycle is operating at greater than 50%, small perturbations in the feedback system may be amplified in sequential cycles, causing unstable operation of the regulator.

As the foregoing illustrates, what is needed in the art is an approach for controlling current mode DC-to-DC voltage regulators that is more robust over a wider range of operating conditions than is provide for in existing art.

SUMMARY OF THE INVENTION

One or more embodiments of the invention provide a system and a method for controlling a voltage output of a voltage regulator using a pulse width modulation (PWM) circuit that employs a non-linear compensation ramp. By employing such a PWM circuit, the voltage output of the voltage regulator can be controlled more robustly over a wider range of operating conditions.

A voltage regulator according to one embodiment of the invention includes an input terminal configured to be coupled to a voltage source, an output terminal configured to be coupled to a load, and a PWM circuit for generating an output having a desired voltage level, the PWM circuit including a switch that is pulsed ON and OFF based on a first voltage that is a function of a voltage ramp that increases non-linearly with respect to time and a second voltage that is a function of a voltage appearing at the output terminal.

A voltage boost (step up) regulator according to another embodiment of the invention includes an inductor having a first port coupled to a voltage source and a second port coupled to an output terminal, and a switch connected to the first port of the inductor, the switch either permitting current flow from the inductor to ground or blocking current flow from the inductor to ground. The switch is pulsed ON and OFF based in part on a voltage ramp that increases non-linearly with respect to time.

A method of controlling a voltage regulator including an inductor having a first port coupled to a voltage source and a second port to an output terminal, and a switch connected in series with the second port of the inductor between the inductor and ground, includes the steps of controlling the switch to permit current flow between the inductor and the ground at the beginning of periodic intervals, generating a signal having a voltage level that increases linearly with respect to time during each of the periodic intervals, and controlling the switch to block current flow between the inductor and the ground based in part on the voltage level of the generated signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
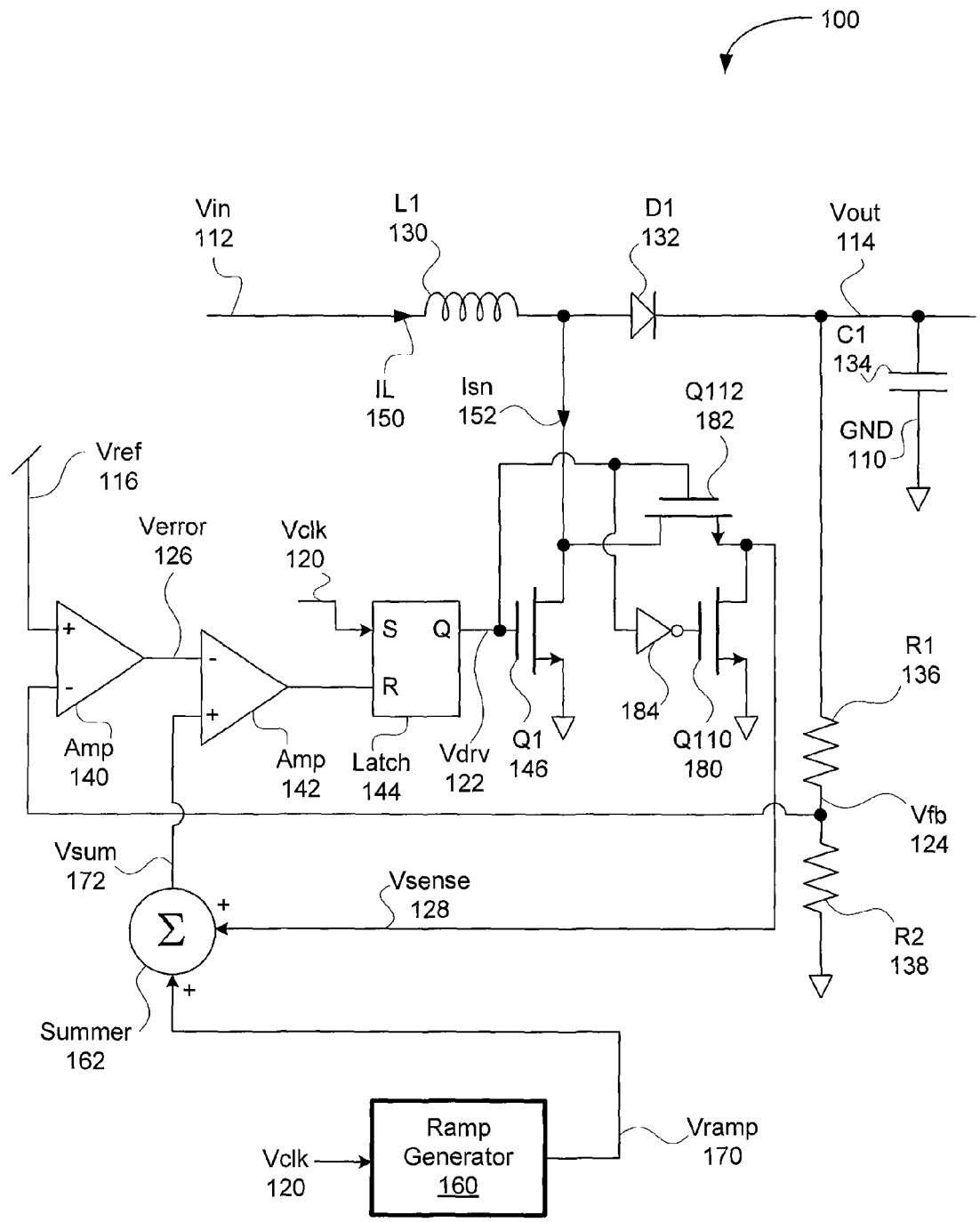
FIG. 1 illustrates a direct current-to-direct current (DC-to-DC) boost voltage regulation circuit configured to implement one or more aspects of the present invention.

FIG. 1 illustrates a direct current-to-direct current (DC-to-DC) boost voltage regulation circuit 100 configured to implement one or more aspects of the present invention. The regulation circuit 100 includes inductor L1 130, diode D1 132, capacitor C1 134, resistor R1 136, resistor R2 138, n-type field-effect transistor (N-FET) Q 146, latch 144, amplifier 140 and 142, summer 162, and ramp generator 160. The regulation circuit 100 also includes N-FETs Q 180, 182, and inverter 184.

Node Vin 112 is driven by an input voltage source, such as a battery, which may be unregulated. Voltages are measured with respect to ground (GND) 110, which represents zero volts. Input current IL 150 flows from the voltage source through L1 130 via one of two paths, depending on the state of Q 146. When Q 146 is turned off (electronic switch is open), IL 150 flows through D1 132 and C1 134 to ground 110. Therefore, when Q 146 is off, energy may be transferred from the input voltage source to C 134 via L1 130. However, when Q 146 is on (electronic switch is closed), IL 150 flows through Q 146 to GND 110. Therefore, when Q 146 is on, energy may be transferred from the input voltage source to L1 130 and Isn 152 tracks IL 150.

The voltage associated with node Vdrv 122 controls Q 146. When Vdrv 122 goes to zero (is driven low), Q 146 turns off and Isn 152 goes to zero. When Vdrv 122 exceeds a gate threshold (is driven high), Q 146 turns on. The voltage on Vdrv 122 is generated by set-reset (SR) latch 144. When the set ("S") input on SR latch 144 is asserted high (a positive voltage defined as a logic "1" in this setting) by Vclk 120, output "Q" is driven high synchronously with a rising edge of Vclk 120. When the reset ("R") input on SR latch 144 is asserted high, output "Q" is asynchronously driven low. Typically, inputs "S" and "R" are not be driven high simultaneously. Vclk 120, discussed in greater detail below, represents a periodic pulse or "clock" signal with a period defined by a certain frequency measured in cycles per second (Hz). The SR latch 144 is, therefore, set periodically and Q 146 is turned on periodically. When input Vsum 172 is equal to or exceeds Verror 126, amplifier 142 drives the reset input of SR latch high and turns off Q 146.

Amplifier 140 generates Verror 126 from a feedback voltage Vfb 124 and a reference voltage Vref 116. The reference voltage Vref 116 may be generated using any technically feasible technique, including, without limitation, a band gap voltage generator. The feedback voltage Vfb 124 is taken from a voltage divider formed by resistors R1 136 and R2 138. The voltage divider samples the output voltage Vout 114. During normal operation Vout 114 provides a regulated output voltage, stabilized by C1 134. The path from Vout 114 to Verror 126 comprises an outer feedback control system.

Vsum 172 is generated by adding two voltages, Vsense 128 and Vramp 170 in summer circuit 162. Voltage Vsense 128 is proportional to current Isn 152, flowing through Q 146, and therefore, Vsense 128 is proportional to the current (IL 150) in L1 130 when Q 146 is turned on. Vramp 170 is generated by ramp generator 160, which is described in greater detail in FIG. 2, below. Ramp generator 160 receives clock signal Vclk 120, which controls when a voltage ramp on Vramp 170 is generated. Amplifier 142 and the associated circuitry for generating Vsum 172 comprise an inner feedback control system. When Vdrv 122 is driven high by latch 144, Q 146 is turned on, allowing current Isn 152 to flow through Q 146 to ground. Simultaneously, Q 182 is turned on, coupling the drain of Q 146 to Vsense 128. When Vdrv 122 is driven low, Q 146 and Q 182 are turned off and Q 180 is turned on, driving Vsense 128 to ground.

Figure 2:
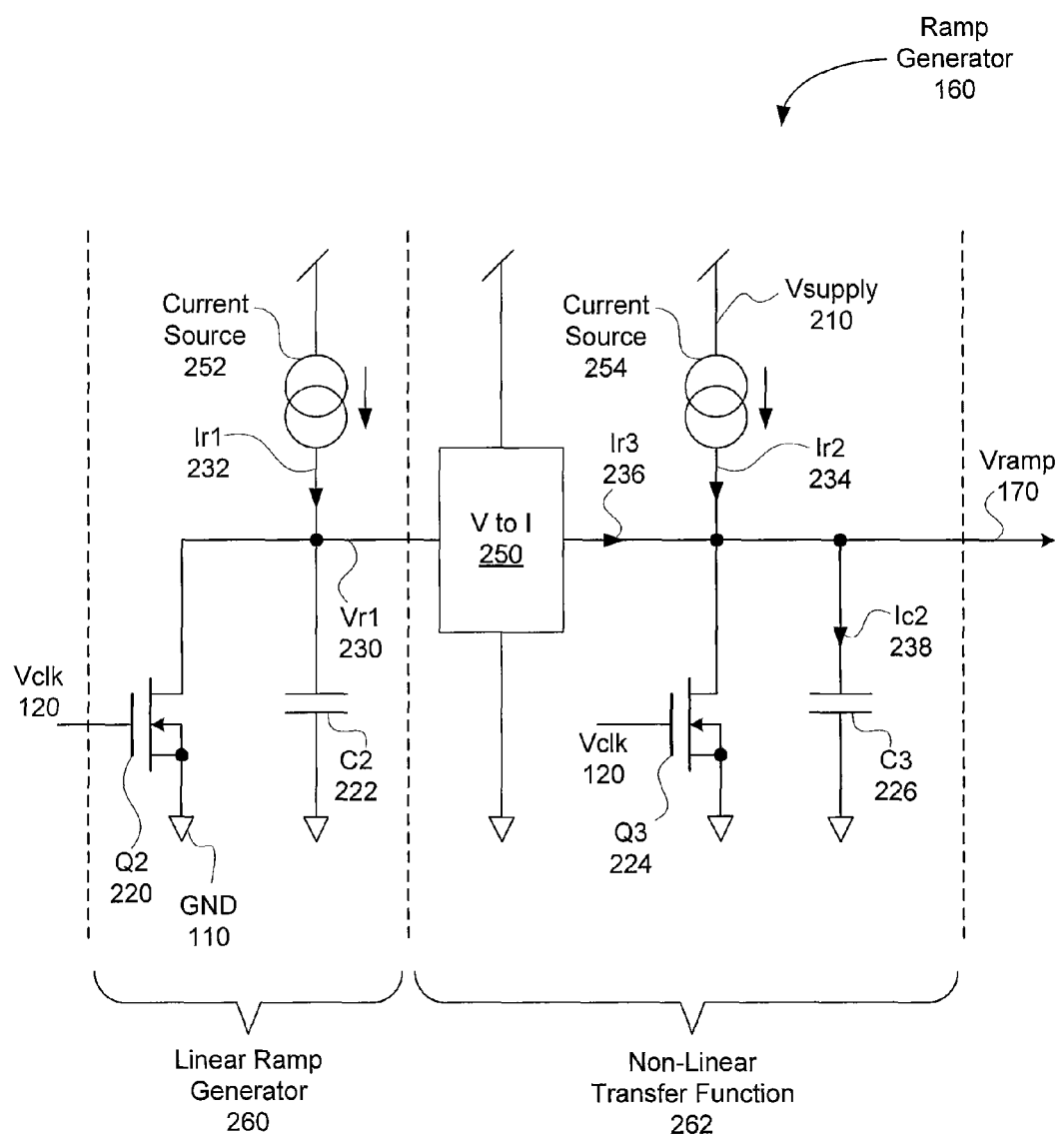
FIG. 2 is a more detailed view of the ramp generator of FIG. 1, according to one embodiment of the present invention.

FIG. 2 is a more detailed view of the ramp generator 160 of FIG. 1, according to one embodiment of the present invention. The ramp generator 160 provides a voltage ramp that includes a parabolic component and a linear component. For short duty cycle operation, stability is less of an issue and the voltage ramp at Vramp 170 is similar to a linear voltage ramp. However, for high duty cycle operation (>50%), the parabolic component begins to dominate the voltage ramp at Vramp 170. This produces two results that lead to greater stability. The first result is a shortening of the "on" time for Vdrv because Vsum 172 reaches Verror 126 sooner with a parabolic ramp. This leads to a second result, which is a bounding of the slope ratio for currents in L1 130. Persons skilled in the art will recognize that an extreme slope ratio in current in L1 130 is a cause of instability between the inner feedback control and outer feedback control, and that limiting the slope ratio results in greater stability.

The ramp generator 160 comprises a linear ramp generator 260 and a non-linear transfer function 262. The linear ramp generator 260 includes N-FET Q2 220, capacitor C2 222, and constant current source 252. The non-linear transfer function 262 comprises N-FET Q3 224, capacitor C3 226, constant current source 254, and voltage to current converter (V to I) 250.

When Vclk 120 is pulsed high, Q2 220 turns on, discharging node Vr1 230 to GND 110. When Vclk 120 returns low, Q2 220 turns off, allowing constant current source 252 to charge C2 222, producing a linear voltage ramp on Vr1 230. The linear voltage ramp on Vr1 is converted to a linear current ramp on Ir3 236 by V to I converter 250. Ir3 236 is combined with Ir2 234 from constant current source 254 to produce current Ic2 238, which charges C3 226. Constant current Ir2 234 contributes a linear voltage ramp component to the charging profile of C3 226. The linear ramp of current Ir3 236 contributes a parabolic voltage ramp component to the charging profile of C3 226. The combined charging profiles for Vramp 170 produce a voltage ramp that includes a linear component and a parabolic component. The contribution of each component may vary with design goals. When Vclk 120 is pulsed high, Q3 224 turns on, discharging node Vramp 170 to GND 110.

Persons skilled in the art will recognize that other structures for the non-linear transfer function may be implemented without departing the scope of this invention. For example, a static rather than time dependent structure may be used non-linear transfer function 262. Furthermore, non-parabolic non-linear transfer functions may be used to achieve different design goals.

Figure 3A:
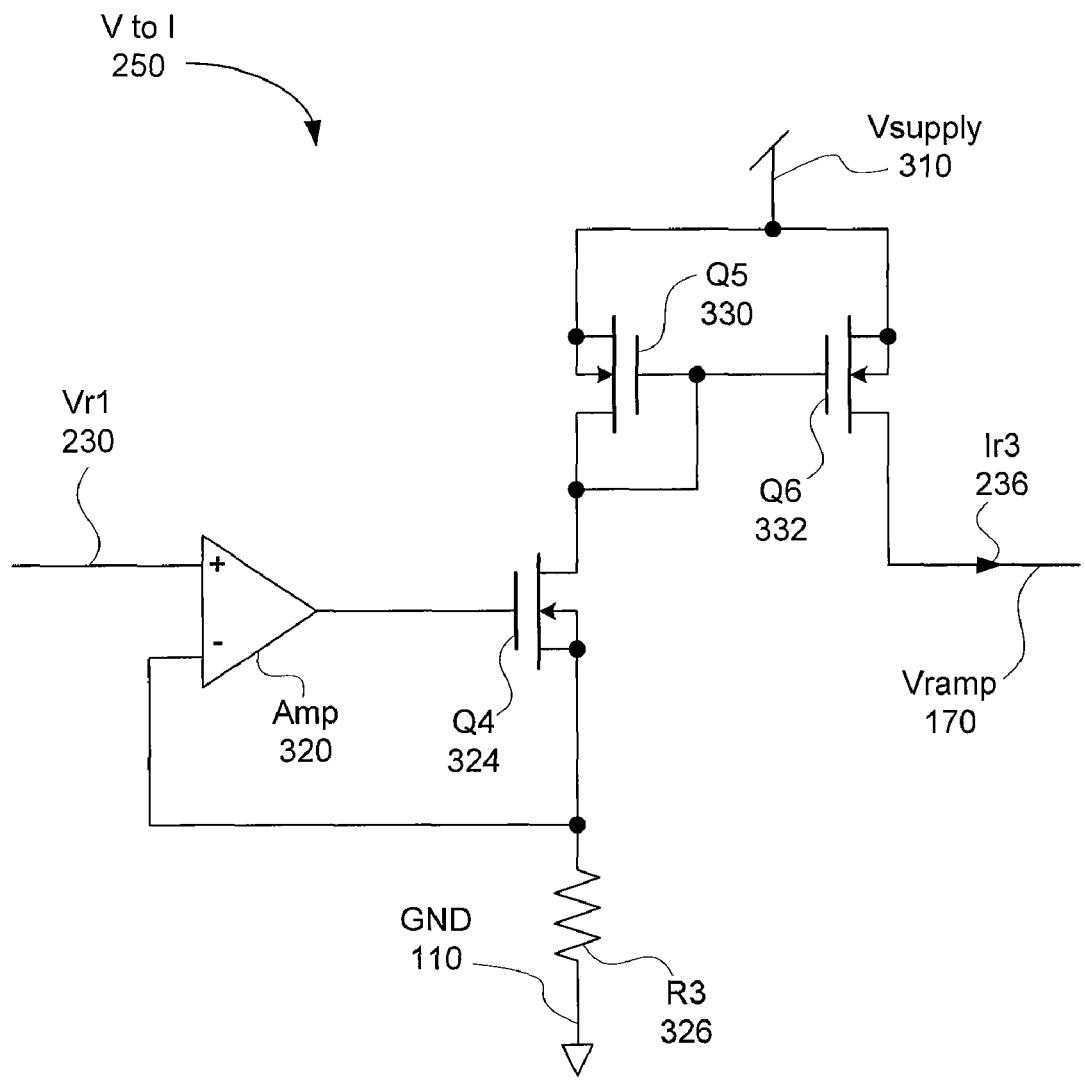
FIG. 3A is a more detailed view of one implementation of the voltage to current converter of FIG. 2.

FIG. 3A is a more detailed view of one implementation of the voltage to current converter 250 of FIG. 2. The V to I converter 250 includes amplifier 320, N-FET Q4 324, resistor R3 326, p-channel field effect transistor (P-FET) Q5 330, and P-FET Q6 332. Amplifier 320 reflects Vr1 230 to the gate of Q4 324, causing Q4 324 to produce a corresponding current through R3 326. The corresponding current is mirrored in the current mirror formed by Q5 330 and Q6 332 to produce current Ir3 236, which is injected into node Vramp 170. Any technically feasible amplifier 320 may be used in this application. Vsupply 310 may be drawn from any technically feasible voltage source.

Figure 3B:
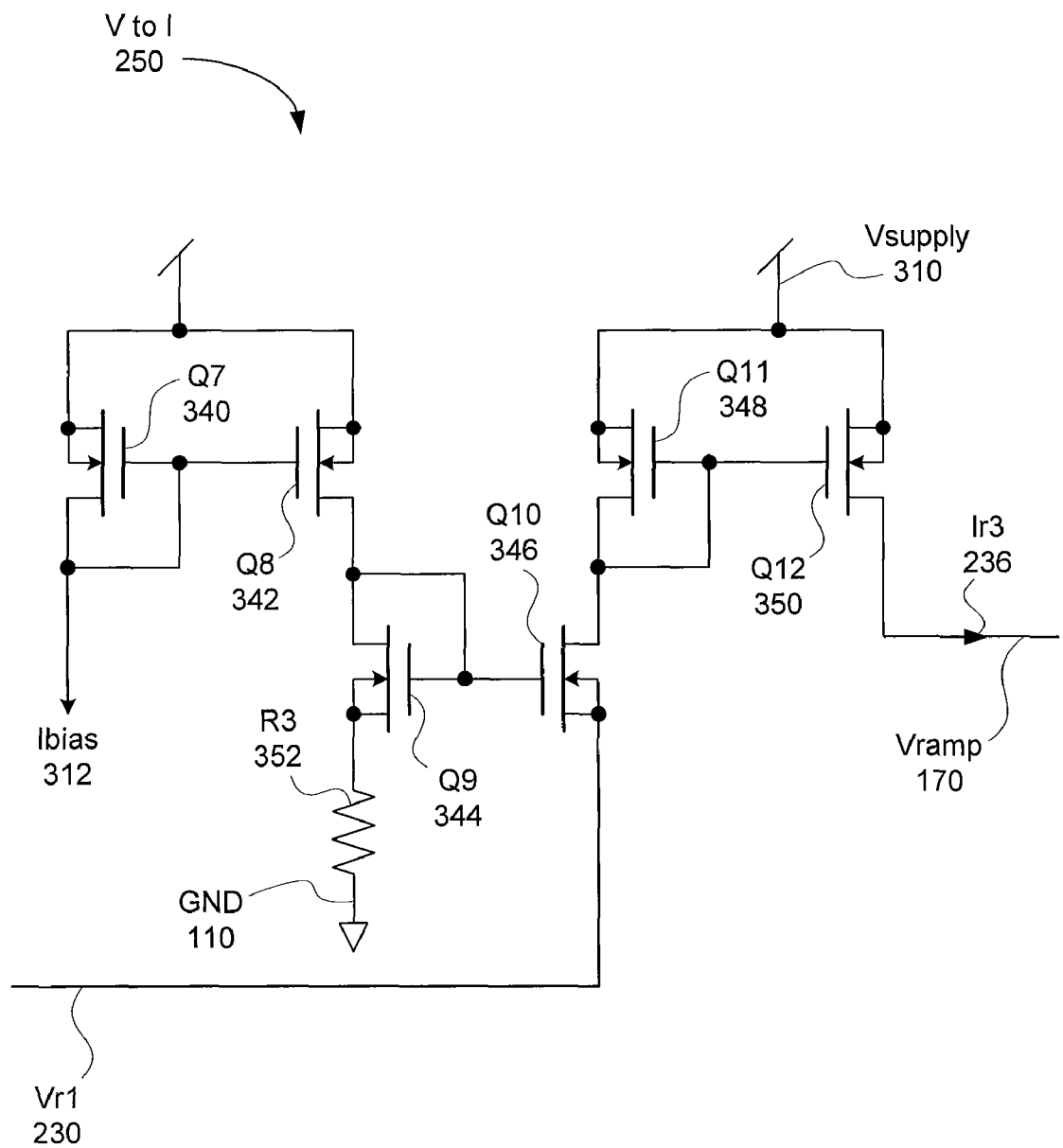
FIG. 3B is a more detailed view of a second implementation of the voltage to current converter of FIG. 2.

FIG. 3B is a more detailed view of a second implementation of the voltage to current converter 250 of FIG. 2. The V to I converter 250 comprises P-FETs Q7 230, Q8 342, Q11 348, and Q12 350, as well as N-FET Q9 344, N-FET Q10 346, and resistor R3 352. P-FETS Q7 340 and Q8 342 form a current mirror that mirrors (bias 312 to Q9 344 through R3 352 to ground. Q9 344 and Q10 form a voltage follower for Vr1 230, which is mirrored by Q11 348 and Q12 350 as current Ir3 236 on node Vramp 170. Vsupply 310 may be drawn from any technically feasible voltage source.

Figure 4:
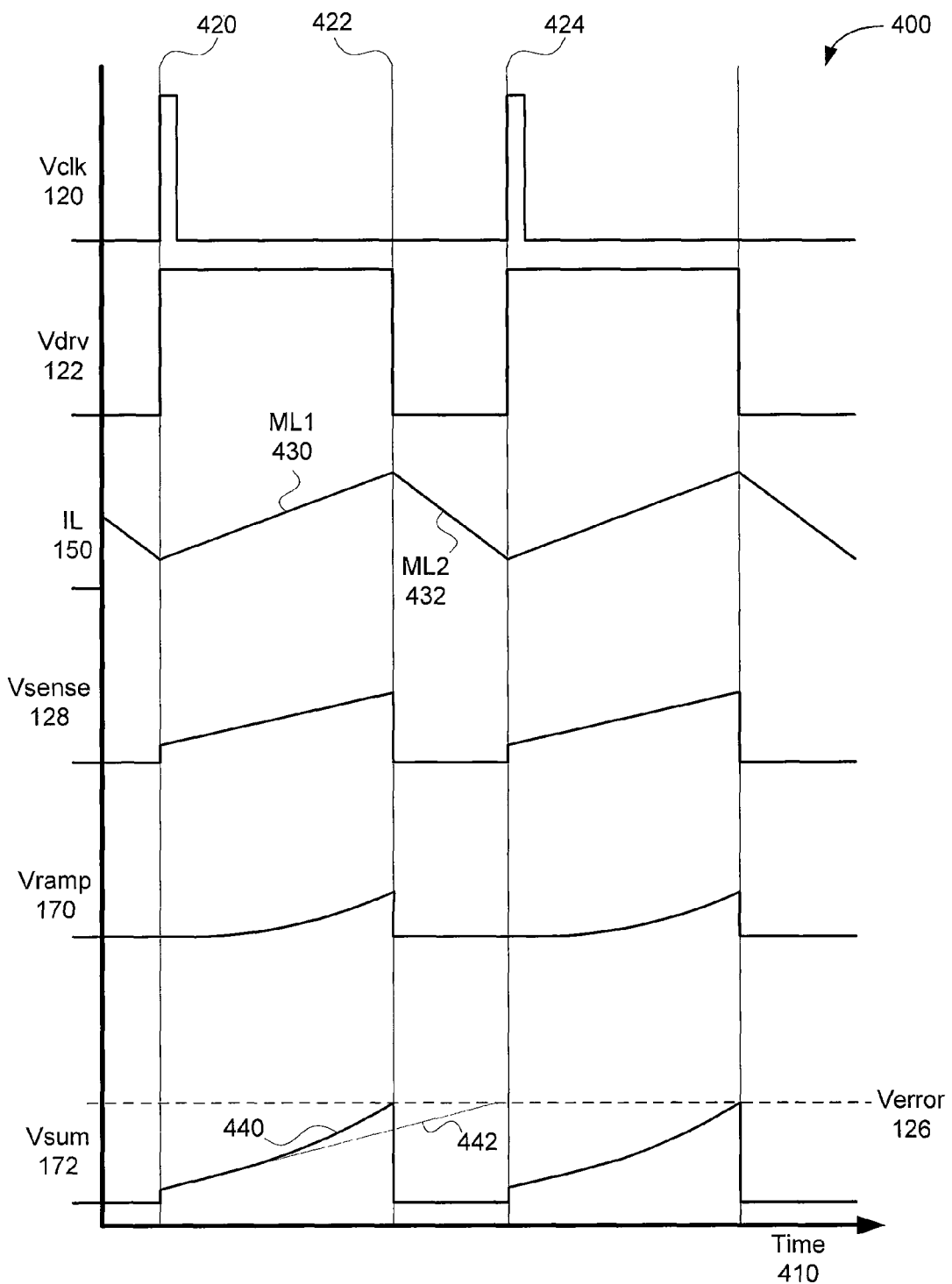
FIG. 4 illustrates waveforms of certain signals within the DC-to-DC voltage regulator circuit of FIG. 1, according to one embodiment of the present invention.

FIG. 4 illustrates waveforms of certain signals within the DC-to-DC voltage regulator circuit 100 of FIG. 1, according to one embodiment of the present invention. The waveforms include Vclk 120 from FIG. 1, Vdrv 122, IL 150, Vsense 128, Vramp 170, and Vsum 172.

Vclk 120 is a clock signal with positive edge at times 420 and 424. Vclk 120 is produced using any technically feasible technique. Vdrv is shown going high on the positive edge of Vclk 120, and going low when Vsum 172 reaches Verror 126. When Vsum 172 reaches Verror 126, amplifier 142 drives the reset input of SR latch 144, resetting the output to drive Vdrv 122 low at time 422.

The current IL 150 through L1 130 is shown increasing with slope ML1 430 when Vdrv 122 is on (Q 146 is on), and decreasing with slope ML2 432 when Vdrv 122 is off (Q 146 is off). The ratio of ML1 430 to ML2 432 should remain bounded for stable operation of the DC-to-DC voltage regulator circuit 100.

Vsense 128 reflects IL 150, and is produced as a product of the on resistance of Q 146 by current Isn 152. When Q 146 is on, Isn 152 is effectively IL 150. The product of the on resistance of Q 146 by Isn 152 is, therefore voltage Vsense 128.

Vramp 170 is generated by ramp generator 160 and includes a linear and parabolic component. Vramp 170 is added to Vsense 128 in summer 162 to produce Vsum 172. A conventional linear trajectory of Vsum 172 would follow path 442, leading to an extreme ratio of ML1 430 to ML2 432. However, a parabolic trajectory of Vsum 172 follows path 440, leading to a bounded ratio of ML1 to ML2 432.

In sum, a technique for robust slope compensation in a DC-to-DC voltage regulator circuit is disclosed. A non-linear slope generator in the current mode regulator provides a compensation ramp that maintains feedback control stability over a broad range of operating duty cycles. In one embodiment a linear ramp voltage signal is generated and converted to a linear ramp current signal, which is used to charge a capacitor. The voltage across the capacitor comprises a compensation voltage ramp that includes a linear component and a parabolic component.

One advantage of the disclosed current mode DC-to-DC voltage regulator circuit is that stability is maintained over a broad range of operating conditions.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. In view of the foregoing, the scope of the present invention is determined by the claims that follow.

I claim:

1. A voltage regulator comprising:
   an input terminal configured to be coupled to a voltage source;
   an output terminal configured to be coupled to a load;
   a pulse width modulation (PWM) circuit for generating an output having a desired voltage level at the output terminal, the PWM circuit including a switch that is pulsed ON and OFF based on a first voltage that is a function of a voltage ramp that increases non-linearly with respect to time and a second voltage that is a function of a voltage appearing at the output terminal; and
   an inductor disposed between the input terminal and the output terminal, wherein the switch controls current flow from the inductor to ground,
   wherein the first voltage is equal to a sum of a voltage level of the voltage ramp and a voltage level sensed from a point between the inductor and the switch, and the second voltage is a difference between a reference voltage and a voltage level proportional to the voltage level appearing at the output terminal.

2. The voltage regulator according to claim 1, wherein the PWM circuit is a current mode PWM circuit.

3. The voltage regulator according to claim 1, wherein the switch is turned ON at the beginning of periodic intervals and the voltage ramp is reset to an initial voltage value at the beginning of the periodic intervals and increases non-linearly with respect to time between the beginning and the end of each of the periodic intervals.

4. The voltage regulator according to claim 1, wherein the switch is turned OFF when the first voltage is greater than the second voltage.

5. The voltage regulator according to claim 1, wherein the voltage ramp increases parabolically.

6. A voltage regulator comprising:
   an inductor having a first port coupled to a voltage source and a second port coupled to an output terminal; and a switch connected to the first port of the inductor, the switch either permitting current flow from the inductor to ground or blocking current flow from the inductor to ground, wherein the switch is pulsed ON and OFF based in part on a voltage ramp that increases non-linearly with respect to time and a reference voltage, a voltage sensed at the second port of the inductor, and a voltage level proportional to a voltage level at the output terminal, and wherein the switch is turned OFF when a sum of the voltage level of the voltage ramp and the voltage sensed at the second port of the inductor is greater than a difference between the reference voltage and the voltage level proportional to the voltage level at the output terminal.

7. The voltage regulator according to claim 6, further comprising a latch for generating ON and OFF control signals for the switch.

8. The voltage regulator according to claim 6, wherein the voltage ramp increases parabolically with respect to time.

9. A method of controlling a voltage regulator including an inductor having a first port coupled to a voltage source and a second port to an output terminal, and a switch connected in series with the second port of the inductor between the inductor and ground, the method comprising:

controlling the switch to permit current flow between the inductor and the ground at the beginning of periodic intervals;

generating a signal having a voltage level that increases non-linearly with respect to time during each of the periodic intervals; and controlling the switch to block current flow between the inductor and the ground based in part on the voltage level of the generated signal, wherein the switch is controlled to block current flow between the inductor and the ground based on factors comprising a reference voltage, a voltage level at the output terminal, and a sensed voltage at the second port of the inductor, and wherein the switch is controlled to block current flow between the inductor and the ground when a sum of the sensed voltage and the voltage level of the generated signal is greater than a difference between the reference voltage and a voltage level proportional to the voltage level at the output terminal.

10. The method according to claim 9, wherein the generated signal increases according to a parabolic function between the beginning and the end of each of the periodic intervals.

* * * * *